May 12, 1936.  D. S. COLE ET AL  2,040,470
ELECTRIC GENERATING SYSTEM AND APPARATUS
Filed Oct. 29, 1932  2 Sheets-Sheet 1
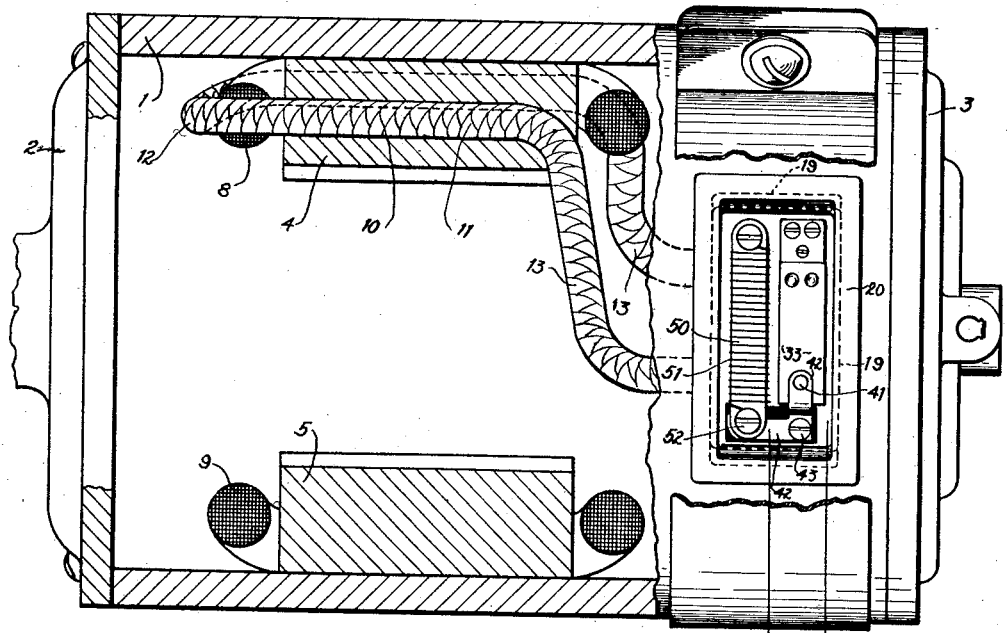
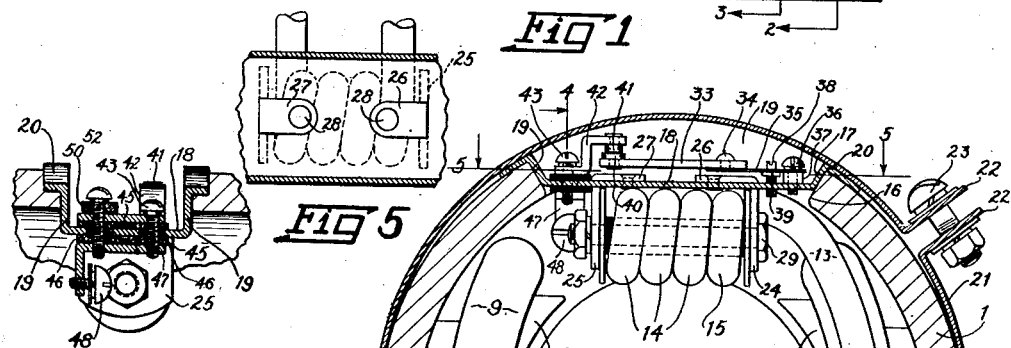
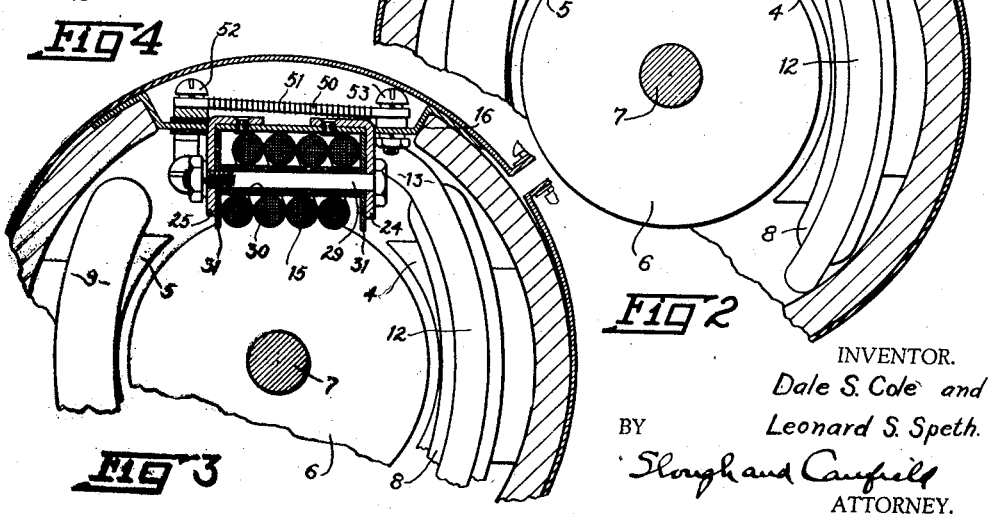
INVENTOR.
Dale S. Cole and
BY  Leonard S. Speth.
Slough and Canfield
ATTORNEY.

May 12, 1936.   D. S. COLE ET AL   2,040,470
ELECTRIC GENERATING SYSTEM AND APPARATUS
Filed Oct. 29, 1932   2 Sheets-Sheet 2

INVENTOR.
Dale S. Cole and
BY   Leonard S. Speth.
ATTORNEY.

Patented May 12, 1936

2,040,470

UNITED STATES PATENT OFFICE 2,040,470

ELECTRIC GENERATING SYSTEM
AND APPARATUS

Dale S. Cole, Cleveland Heights, and Leonard S. Speth, Cleveland, Ohio, assignors, by mesne assignments, to The Leece-Neville Company, Cleveland, Ohio, a corporation of Ohio Application October 29, 1932, Serial No. 640,264

19 Claims. (Cl. 171—313)

This invention relates to electric generating systems and apparatus, and particularly to generating systems and apparatus in which an electric generator is rotatably driven by a variable speed source of power.

Typical of such generating systems and apparatus is that employed on automotive vehicles, wherein an electric generator is driven by the vehicle engine.

Such systems commonly include a storage battery, lamps and other apparatus energized by current from the generator, and various means have been accordingly devised to regulate or control the output of the variable speed generator to maintain the same within limits suitable for the energized apparatus.

For example, in some systems the current output has been controlled or regulated by the so-called "third brush" generator construction; in another system, the generated voltage has been regulated by so-called "voltage regulation" apparatus accessory to the generator.

Both the current regulation systems and voltage regulation systems heretofore employed have merits which have led to their use on motor driven vehicles.

The control of the generator output by regulating its voltage is generally recognized as superior to the current regulation, particularly when storage batteries and lamps are to be energized by the generator; but its general adoption has been prevented by the relatively great cost of the apparatus accessory to the generator by which the voltage regulation is effected.

In a typical voltage regulation system and apparatus for example, a regulating panel is provided on which is mounted an electro-magnetic relay having its winding energized proportional to the generator voltage; and the contacts of the relay control the energization of the generator field winding. Upon a rise of voltage above the predetermined desired value, the relay contacts are operated magnetically to break the field winding circuit, or to insert resistance in series with the field winding or otherwise to weaken the field to effect a reduction of voltage. When the voltage falls to the predetermined value, the relay contacts are operated by a spring to restore the field circuit. In operation, such relays open and close rapidly with a vibratory movement.

The continuous vibratory operation of such regulating relays to repeatedly break the highly inductive field circuit, or to repeatedly insert resistance thereinto, is attended by destructive arcing and rapid deterioration of the relay contacts; and this together with the added cost of manufacturing and installing such regulator panels and the vibratory electro-magnetic relays and other necessary parts thereon has largely prevented the general adoption of the voltage regulated generator system for automotive vehicles, and has confined its use to a limited field of application.

In a copending application filed by us on June 3, 1932, Serial No. 615,170 for Improvements in electric generating systems, there is illustrated and described an improved electric generating system and apparatus whereby the voltage output of a variable speed electric generator may be regulated to a substantially constant value at all speeds within a predetermined working speed range, the voltage regulation being effected by a vibratory relay respectively opening to insert a resistance in the field circuit and closing to short-circuit it, upon the attainment of generated voltage above a predetermined value or respectively falling to or below the predetermined value.

In said application is illustrated and described a system in which the cost of manufacturing and installation of the parts is reduced to the minimum by mounting the vibratory relay directly upon the frame of the generator to dispense with the cost of a supporting panel and accessory wiring. In the system described in that application furthermore, one of the field windings, or an accessory field winding, provided on one of the field poles is energized reversely or in a bucking relation to the normal polarity of that pole, and the magnetic circuit of the vibratory relay is energized by flux generated by said reverse winding. Among a number of very important advantages resulting from this arrangement are that a separate winding for the relay is unnecessary and the cost of the regulating equipment is thereby reduced; and that, due to the functioning of the reverse field winding, as fully described in that application, the field strength of the generator dies out very rapidly upon opening of the relay contacts to insert resistance in the field circuit, and thus the tendency to arc at the relay contacts is reduced to the minimum or substantially completely destroyed; and that the rapid dying out of the field flux not only increases the rate of vibration of the relay and therefore effects a more nearly non-fluctuating output from the generator, but the reduction or complete elimination of arcing effected thereby makes it possible to employ smaller more compact relay parts to still further reduce the cost of the apparatus and in addition prolongs the life thereof almost indefinitely.

One of the advantages furthermore of such a system and apparatus as described in said application is that it may be applied to existing generators, such for example as third brush current regulation generators to transform them into voltage regulation generators, or into generators which limit their current output by their third brush and which limit their voltage output by the voltage regulation accessory parts.

In said application also we have illustrated and described one form of an accessory apparatus which may be applied to a commercial generator, for example of the third brush current regulation type, to transform it into a voltage regulation generator.

It is an object of the instant application to provide an improved means whereby a variable speed generator whose voltage varies with its speed, may be adapted to deliver a substantially constant voltage output at all speeds within a working speed range.

Another object is to provide an improved means in the form of an accessory apparatus which may be applied to a non-voltage regulating generator to transform it or adapt it to deliver a substantially constant voltage.

Another object of this invention is to provide such an accessory device which may be applied to a commercial generator without the necessity of performing any machine operations upon the existing generator or otherwise modifying it physically.

Another object is to provide an improved accessory or like apparatus which may be applied to an existing generator to convert it into a voltage regulation generator and comprising a bucking field winding and a voltage-regulation vibratory relay energized thereby and means for attaching it to the existing generator in an improved manner.

Another object is to provide a voltage-regulating vibratory relay for generators of improved construction.

Another object is to provide a voltage-regulation vibratory switch for generators having improved means for enclosing it against the accumulation thereon of dust and dirt.

Another object is to provide as an accessory device for existing generators, an improved switch construction comprising in unit form a cut-out switch for the generator load circuit and a vibratory voltage regulating relay and an energizing winding for both, which winding also functions as a bucking field winding in connection with the voltage regulation.

Another object is to provide a device of the class referred to which will be cheap to manufacture and install and which will effect improved efficient operation.

Another object is to provide for electric generators, an improved switch construction comprising in unit form a cutout switch for the generator load circuit and a vibratory voltage regulating relay having magnetic circuits energized responsive to generated voltage, and a single adjusting means for adjusting the cut-out switch and the relay to adjustably vary the voltage to which they operatively respond.

Other objects will be apparent to those skilled in the art to which my invention appertains.

Our invention is fully disclosed in the following description taken in connection with the accompanying drawings, in which:—

Fig. 1 is a plan view partly in cross-section and with parts broken away for clearness, of a commercial generator and with an embodiment of my invention applied thereto;

Fig. 2 is a cross-sectional view taken approximately from the plane 2 of Fig. 1;

Fig. 3 is a view generally similar to Fig. 2 but taken from the plane 3 of Fig. 1;

Fig. 4 is a fragmentary view taken from the plane 4 of Fig. 2;

Fig. 5 is a fragmentary view taken approximately from the plane 5 of Fig. 2;

Figure 7:
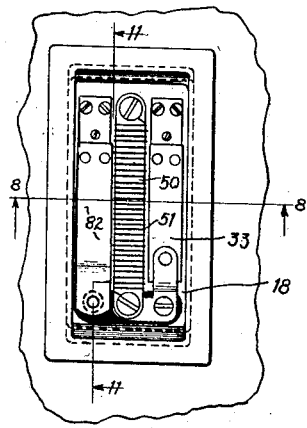
Fig. 7 is a view similar to a part of Fig. 1 illustrating a modification.

Referring to the drawings we have shown generally at 1 a cylindrical hollow shell such as employed in commercial generators and at 2 and 3, respectively, end covers or housing portions. At 4 and 5, respectivey, are pole pieces secured to the inner wall of the shell 1, the shell thus constituting a return path or yoke for the field flux.

In Figs. 2 and 3 we have illustrated also at 6, in simplified form, an armature, and at 7 a shaft therefor, these parts being omitted for simplicity from Fig. 1, but as will be understood, the shaft 7 may be rotatively mounted in suitable bearings in the end housing members 2 and 3. At 8 and 9 are indicated field windings on the pole pieces 4 and 5 respectively.

At 10 is illustrated a winding which is preferably made, according to usual practice, from numerous turns of relatively small wire wrapped into a unit by suitable tape wrapping as indicated at 11. The winding 10 has a large loop portion 12 formed to substantially embrace one of the field poles such as the pole 4 and is preferably large enough to be placed around the outside of the winding 8. The loop portion 12 is formed to lie against the inner wall of the shell 1 for a substantial portion thereof and the ends 13—13 of the winding 10 are carried axially along the generator and are formed into a plurality of turns 14—14 constituting a winding 15 for energizing a voltage regulation vibratory relay, to be described.

Generators of the usual commercial construction are provided with an aperture in the shell 1 as indicated at 16, Figs. 2 and 3, which aperture is generally of rectangular form and is generally provided for the purpose of giving access to the generator brushes.

In the practice of our invention we employ this aperture as a means to support and position the voltage regulation relay embodied in our invention. Preferably we form from sheet metal a pan-like base 17 having a bottom portion 18, side walls 19—19 and a peripheral flange 20. The pan is of such size and shape that the side walls 19—19 just fit within the periphery of the aperture 16 and the flange 20 overlaps the shell of the generator around the aperture.

As will be described, parts of the voltage regulating relay are mounted on the base 18 of the pan and with make and break switch contact parts on the concave side of the pan. These parts are thus shielded from the accumulation of carbon or copper dust which may be thrown off from the generator commutator and brushes. To secure the pan and therefore its associated parts in position, we employ the band 21 which is normally employed to cover up the aperture 16 in commercial generators. This band is usually formed from sheet metal, is wrapped around the generator shell and is wide enough axially of the generator to entirely cover the aperture 16. The band may be provided with a pair of ears 22—22 at its adjacent ends through which a bolt 23 may be projected to draw the ends of the band together to clamp them tightly upon the generator. When this band is wrapped around the generator and over the pan flange 20, it rigidly secures the pan in the aperture 16 by its clamping action, and furthermore by covering the entire pan shields the parts mounted on the concave side of the pan from the accumulation of dust or dirt from outside the generator. The band thus performs a double function.

Projecting downwardly from the bottom 18 of the pan is a pair of spaced elements 24 and 25 formed from steel or other ferrous sheet metal having respectively ears 26 and 27 projected upwardly through perforations in the pan bottom 18 and bent over parallel therewith and riveted thereto by rivets 28—28, see particularly Fig. 5.

A bolt of iron or like ferrous metal 29 is projected through aligned perforations in the elements 24 and 25 and clamps therebetween an insulating sleeve 30 and heads of insulating material 31—31. The winding 15, above described, is disposed around the bushing 30 and an electromagnet is thus provided, comprising a core 29, pole pieces 27 and 26 and a winding 15 on a spool 31. The pan is preferably formed from non-magnetic material such as brass so as not to short-circuit the magnetic path between the pole pieces 26 and 27. An armature 33, formed from ferrous metal, is riveted as at 34 to a flat resilient spring element 35 extending from the armature and rigidly secured by a screw 36 and a thick washer 37 to the pan bottom. The armature 33 is disposed over the pole pieces or ears 27 and 26 and when the magnetic circuit above described is sufficiently energized, is attracted toward the pole pieces being slightly spaced therefrom to provide suitable working air gaps in a well known manner.

The spring 35 tends to hold the armature away from the pole pieces and its retractile force may be adjusted by a stud 38 screwed into the pan bottom and having a collar 39 engaging the under side of the spring 35, a screw-threaded shank end thereof projecting upwardly through a suitable perforation in the spring. The spring 35 is shaped so as to tend normally to hold the armature too close to the pole pieces 26 and 27 and thus presses upon the collar 39. If desired, the spring may be shaped so as to tend normally to hold the armature too far from the pole pieces and accordingly the collar 39 may be disposed on the other side of the spring.

The free end of the armature 33 carries a contact 40 engageable, in the retracted position of the armature 33, with a stationary contact 41 carried on a bracket 42 which is rigidly secured on the pan bottom and insulated therefrom in the following manner.

A screw 43 is projected through the bracket 42 and through an aligned perforation in the pan bottom 18 and into a bracket 47, the latter serving as a nut. Suitable insulating strips 45—45 on opposite sides of the pan bottom and an insulating washer 46 surrounding the screw insulates the screw and therefore the bracket 42 from the pan bottom. The bracket 47 is provided with a terminal connection screw 48 to which an electric circuit wire may be attached.

A block of insulating material 50 has wound thereon a length of resistance wire 51. One end of the block 50 is secured to and insulated from the pan bottom by a screw 52 associated with the pan and with the bracket 47 similarly to the screw 43; and one end of the resistance wire 51 is connected to the screw 52 and therefore to the terminal screw 48. The other end of the resistance wire 51 is connected to a bolt 53 projected through the block 50 and through the bottom 18 of the pan.

It will thus be observed that both the contact 40 and the said end of the resistance wire 51 are grounded upon the pan bottom; and that the other contact 41 and the other end of the resistance wire 51 are insulated from the pan and from other grounded parts of the generator and terminate electrically at the terminal screw 48.

The electric circuit connection of the parts above described which will presently be considered, is so arranged that the ampere turns of the winding 10 oppose those of the field winding 8; and that the resistance 51 is inserted in the circuit when the contacts 40—41 are opened.

Figure 6:
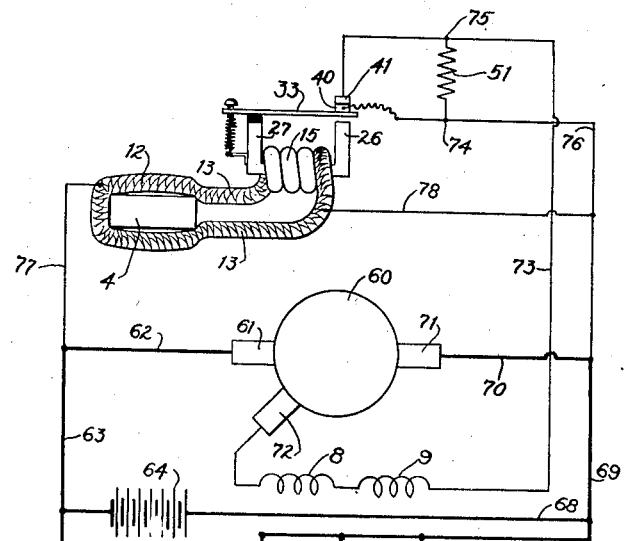
Fig. 6 is a diagrammatic view of an electric generating system with which our invention may be practiced and illustrating in simplified diagrammatic form some of the elements of Figs. 1 to 5 inclusive.

The electric connections and mode of operation and function of the parts thus for described may be more clearly understood by reference to the diagram of connections Fig. 6. In this figure, some of the mechanical parts of Figs. 1 to 5 are shown reproduced in simplified form, among which are the pole piece 4 of the generator, the loop 12 of the winding 10 embracing this pole piece, the winding 15 energizing the pole pieces 26 and 27 of the vibratory relay, the armature 33 thereof and the contacts 40 and 41 together with the resistance unit 51.

It will now be understood that the generator shown generally at 60 is energized by the field windings 8 and 9, the winding 12 opposing the field winding 8.

The main load circuit of the generator may be traced from its brush 61 through wires 62 and 63 either to a battery 64 or to a load line 65 from which it may energize lamps or the like 66, and then may be traced by a return line 67, from the lamps 66 and a return line 68 from the battery 64, and by way of wires 69 and 70 back to the brush 71 of the generator.

The fields 8 and 9 are energized across the brush 71 and a third brush 72. The circuit may be traced from the brush 72 through the windings 8 and 9 and thence by wire 73 to the point 75 where the circuit is optional, either through the resistance 51 or through the contacts 40 and 41 around the resistance when the contacts are closed to the point 74 and thence by wire 76 and wire 70 back to the brush 71.

The winding loop 12 opposing the field 8 is energized across the brushes 61 and 71 by the circuit including the wire 62, a wire 77, the loop 12 and the winding 15 in series, and thence by a wire 78 to the wire 76 and back to the brush 71.

In operation, when the generator attains a certain predetermined speed and regulating voltage, the energization of the winding 15 is sufficient to open the contacts 40—41 and insert the resistance 51 in the field circuit to weaken the field and effect a reduction of voltage. The opposing energization by the loop 12 hastens the decay of field strength in a manner more fully described in the above-mentioned application, and for the purposes and advantages fully set forth therein.

Upon the decay of the flux and corresponding decay of the voltage to the regulating value, the armature 33 is retracted and closes the contact, short-circuiting the resistance 51 and permitting the voltage again to rise, and so on.

The vibratory relay construction including the pan and the parts secured thereto as above described and the winding 15 on the relay core connected with or integrally formed with the winding 10 may be constructed as a unit completely assembled and it may be installed upon a commercial generator to convert it into a voltage regulation generator merely by removing the band 21, inserting the loop 12 through the aperture 16, disposing it around the winding 8 connecting the winding 10 in the generator circuit, and seating the pan in the aperture and replacing the band 21.

If desired, of course, tape or other means may be applied to more firmly secure the loop 12 in position.

The slight changes in the electric circuit from that of the commercial generator will be obvious to those skilled in the art, particularly in view of the diagrammatic showing of Fig. 6. It is customary to ground the brush 11.

Figure 8:
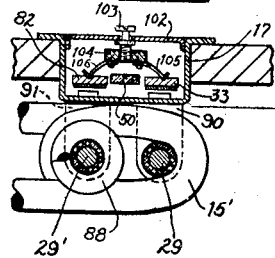
Fig. 8 is a view taken from the plane 8 of Fig. 7.
Figure 9:
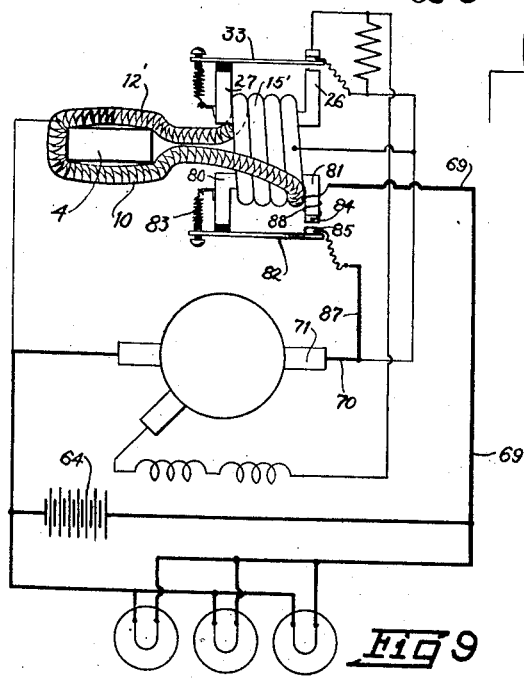
Fig. 9 is a diagrammatic view similar in general to Fig. 6, but illustrating the employment of the form of our invention illustrated in Figs. 7 and 8.

In Figs. 7, 8 and 9 we have illustrated a modification of our invention in which is included the cut-out switch commonly employed in variable speed generating systems to disconnect the generator from its load circuit when the speed and voltage fall below a predetermined value and to connect it again to the circuit when the voltage rises to the predetermined value.

Referring to the diagram of Fig. 9, such a system is shown.

As illustrated in Fig. 9, the winding 15' corresponding to the winding 15 above described embraces or encircles, besides the magnetic circuit comprising the armature 33 and pole pieces 26 and 27, a second magnetic circuit comprising pole pieces 80 and 81 disposed to energize and attract an armature 82 against the resilience of a spring 83 to close a pair of contacts 84 and 85. The winding 15' is integral with and in series with a loop 12' corresponding to the loop 12 of the first form encircling the pole piece 4 of the generator.

The circuits of the diagram of Fig. 9 are substantially the same as of Fig. 6 except that the main 70, connected to the brush 71 instead of leading directly to the battery and load circuit, goes first by way of a wire 87 to the contact 85; the other contact 84 is connected to a winding 88 around the pole piece 81, which is connected to the line 69. When the contacts 84 and 85 are closed, the circuit is completed through the contacts and through the wire 69, and so on as in Fig. 6.

In the operation of the apparatus and connections of Fig. 9, when the speed of the generator causes it to reach a predetermined voltage, the energization of the winding 15' will cause the contacts 84—85 to close and thereafter they will be held closed partly by the winding 15' and partly by the winding 88. If subsequently the voltage falls below the predetermined value, it is desirable that the contacts 84—85 shall open in order to prevent the battery 64 from discharging backward through the system. To this end, the winding 88 is employed and, as will now be understood, if current from the battery tends to flow backward through the line 69—89 and through the winding 88, it will oppose any remnant of magnetism in the pole piece 81 and destroy the magnetic pull and permit the contacts to open.

The same winding 15' acting on the armature 33 will effect voltage regulation as described for Fig. 6.

Thus in this form, the single winding 15—15' energized proportionately to the generator voltage performs three functions: that of the bucking loop 12' (corresponding to the loop 12 of the other form), that of voltage regulation by the armature 33, and that of cut-out function by the armature 82. Thus the maximum economy is effected.

One form of embodiment of the apparatus illustrated diagrammatically and discussed above in connection with Fig. 9 is illustrated in Figs. 7, 8, 10 and 11. Herein, the same pan 17 is shown as in the other form upon the bottom 18 of which the switch and relay elements are secured. As shown in Figs. 7 and 8, the relay armature 33 and resistance block 50 and resistance wire 51 are made slightly smaller in transverse dimension in order to leave room for the armature 82 of the cut-out switch.

Figure 11:
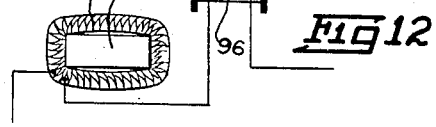
Fig. 11 is a sectional view taken from the plane 11 of Fig. 7.

As shown in Fig. 11, the cut-out switch armature 82 may be secured at its rearward or right-hand end as viewed in Fig. 11 in a manner similar to that for the armature 33 above described. Its opposite end may be bent upwardly as at 98 and provided with a contact 85. A stationary contact 84 may be secured to and insulated from the pan bottom 18 as shown generally at 99 and may be engaged by the contact 85 when the latter is magnetically depressed in a manner to be described.

To provide magnetic energization for both armatures 33 and 82, there may be secured to the pan bottom 18 as shown in Fig. 8, supplemented by Fig. 11, a pair of depending pole pieces 90—90 (only one of which is shown) supporting the core bolt 29 of the magnetic circuit for the armature 33, and an additional pair of depending pole pieces 91—91 for supporting a core bolt 29' similar to the bolt 29, for a magnetic circuit of the armature 82. The pole pieces 90 and 91 may have ears extending upwardly through perforations in the bottom 18 and may provide air gaps between the pole pieces and the armatures as fully described for the first form hereinbefore.

The winding 15' above described may encircle or embrace both bolts 29 and 29' to magnetically energize the same.

In this form, the winding 15' may be confined to a portion, longitudinally considered, of the bolts 29 and 29'; and the bolt 29' may have wound thereon the winding 88 referred to in connection with Fig. 9.

One terminal of the winding 88 may be connected to the contact 84 as shown generally at 100; and the other terminal of the winding 88 corresponds to the line 69 of Fig. 9.

From the description of Fig. 9, it is now believed that an understanding of the form of Figs. 7, 8, 10 and 11 may be had from the foregoing description of construction of the parts. It may be added, however, that energization by the winding 15', corresponding to the generated voltage, will effect operation of the vibratory relay armature 33 to effect voltage regulation as described hereinbefore, and the same energization will attract the armature 82 to close the contacts 84—85, the winding 88 being thereby inserted in the circuit as described in Fig. 9.

In Fig. 8 is illustrated a further modification which may be employed if desired. The armatures 82 and 33 may, by means of their springs 35—35, tend to take up positions relatively remote from their magnetic circuits, and the following single adjustment means may be provided to adjust them to operate, that is to say, be magnetically attracted by the magnetism generated by the winding 15', at substantially the same voltage value. To this end, a bridge piece 102 may span the side walls of the pan 17. Centrally thereof, a screw 103 may be mounted in the bridge piece and adapted to rotate in a perforation therein substantially without axial movement. The inner end of the screw 103 may be threaded into a block 104 having secured thereto a pair of springs 105 and 106. The springs 105 and 106 may be formed from flat resilient metal secured at one end of the block 104 and at their opposite ends engaging the upper sides of the armatures 82 and 33.

To prevent revolution of the block 104 and its springs around the axis of the screw 103, the outer ends of the springs 105 and 106 may seat in slight depressions in the upper sides of the armatures as indicated in Fig. 8.

As will now be apparent, upon turning the screw 103, the block 104 will be propelled inwardly outwardly to vary the tension of the springs 105 and 106 onto their armatures 33 and 82 to vary their responsiveness to the magnetic traction. To this end the springs 105 and 106 are preferably made identical.

With this adjustment means, the cut-out switch will not close and connect the battery and the work circuits to the generator until the generated voltage has reached the regulating voltage; and if the regulating voltage be adjustably changed, the same condition will be obtained because the adjustment of the cut-out will correspondingly be changed.

Figures 10, 12:
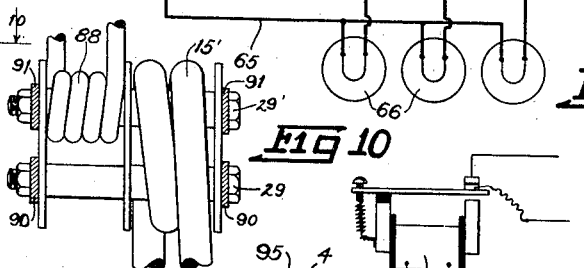
Fig. 10 is a sectional view taken from the plane 10 of Fig. 8.
Fig. 12 is a fragmentary diagrammatic view illustrating another form in which our invention may be practiced.

In Fig. 12, a modification of the construction of the reverse field winding and the winding energizing the voltage regulating relay or voltage regulating relay and cut-out switch is illustrated. In this form, the reverse winding 95 embraces only the pole piece 4, and a separate winding more in the form of a spool 96 is provided to energize the local magnetic circuit of the regulating relay or of this relay and the cut-out switch. The two windings 95 and 96 are connected in series as illustrated and thus their functions and mode of operation are not altered by this difference of construction; and furthermore, the two windings 95 and 96 may be assembled together with the magnetic circuits of the relay or of the relay and cut-out switch and applied as a complete accessory device to a commercial generator to convert it into a voltage regulating generator with an improved cut-out switch and circuit.

Whereas hereinbefore we have described generators of the two-pole type, it will be understood that our invention may be applied to a multi-polar generator and a reference to this type of generator and system may be found in the above-mentioned application.

Our invention is not limited to the exact details of construction shown and described. Other changes and modifications may be made therefrom without departing from the spirit and scope of the invention and without sacrificing its advantages.

We claim:

1. In an accessory apparatus adapted to be applied to a variable speed variable voltage generator of the type having an aperture in the generator frame wall, to convert the generator into a substantially constant voltage generator, a base adapted to be disposed in the aperture, switch contacts and a magnetically tractable switch operating armature on one side of the base, an energizing ferrous magnetic circuit for the armature on the other side of the base comprising a core element and magnetizable elements extending through the base into proximity with the switch operating armature, a winding on the core element and a loop of the winding formed and disposed to be looped around a field pole of the generator.

2. In an electric generator construction, a generator frame comprising a walled compartment, an aperture in the compartment wall, a generator armature positioned within said walled compartment and adapted to be connected to a load circuit, a switch base disposed in the aperture and substantially closing the same and secured upon the compartment wall, an electro-magnetic switch supported on the base comprising a magnetic circuit including a ferrous core element and a magnetically tractable armature and switch contacts controlled by movement of the armature, a winding for the core element, a circuit for energizing the winding commensurably with voltage generated in the armature, and connections for including the contacts in series with the load circuit, and a removable band extending around the generator frame over the aperture and switch and upon removal giving access to the switch.

3. An electric generator construction as described in claim 2 and in which the base is in the form of an outwardly open pan seated in the aperture and the switch contacts are in the pan.

4. In an electric generator construction, a generator frame comprising a walled compartment, an aperture in the compartment wall, a generator armature positioned in said walled compartment, connections for connecting the armature to a load circuit, a field pole having a winding whereby it may be energized with magnetic flux of a normal polarity by current generated in the armature, a winding of opposite polarity on the pole and a circuit whereby it may be energized commensurably with voltage generated in the armature, a switch base disposed in the aperture and secured upon the compartment wall, a pair of electro-magnetic switches supported on the base each comprising a ferrous core element and a magnetically tractable armature and switch contacts controlled by movement of the armature, and the winding of opposite polarity having a portion thereof looped around both ferrous core elements to energize the same, connections for one of the switches for including its contacts in a circuit controlling field energization of the generator and connections for the other switch for including its contacts in the load circuit.

5. An electric generator construction as described in claim 4 and in which the base is in the form of a pan outwardly open substantially closing at least a part of the aperture and the switches are in the pan.

6. In an electric generator construction a generator frame comprising a walled compartment, an aperture in the compartment wall, a generator armature positioned in said walled compartment and adapted to be connected to a load circuit, a field pole having a winding whereby it may be energized with magnetic flux of a normal polarity, a switch base disposed in the aperture and secured upon the compartment wall, a pair of electro-magnetic switches on the base comprising each a ferrous core element, a magnetically tractable armature and switch contacts controlled by movement of the armature, connections for one set of contacts for including the contacts in a circuit controlling the energization of the generator field and connections for the other set of contacts for including the contacts in the load circuit, and a single winding for both core elements, and a circuit for energizing said winding commensurably with voltage in the armature.

7. In an electric generating system, a variable speed generator, comprising an armature and a work circuit, a cut-out switch comprising a magnetically tractable armature and contacts connected in the work circuit for closing and opening the work circuit and operable by the magnetically tractable armature at predetermined high and low generator voltage values, a relay comprising a magnetically tractable armature and contacts connected in a circuit controlling the field energization and operable by said magnetically tractable armature responsive to predetermined high and low voltage values to maintain the generator voltage substantially constant, a magnetic circuit for each armature comprising a core element, a common winding for both core elements, a circuit for energizing said winding commensurably with voltage generated in the armature and separate resilient means for retracting the switch and relay armatures and a common adjusting means for adjusting the resilient means of both the switch and relay to simultaneously vary their operating voltages.

8. In an electric generating system, a variable speed generator, comprising an armature and a work circuit, a cut-out switch comprising a magnetically tractable armature and contacts connected in the work circuit for closing and opening the work circuit and operable by the magnectically tractable armature at predetermined high and low generator voltage values, a relay comprising a magnetically tractable armature and contacts connected in a circuit controlling the field energization and operable by the magnetically tractable armature responsive to predetermined high and low voltage values to maintain the generator voltage substantially constant, a magnetic circuit for each armature comprising a core element, a common winding for both core elements, a circuit for energizing the winding commensurably with voltage generated in the armature, separate resilient means for retracting the armatures of the switch and relay and separate adjusting means for the resilient retracting means to adjust the operating voltages of the switch and relay, and a common adjusting means for simultaneously varying the resilience of the retracting means to simultaneously vary the adjusted voltages.

9. In an electric generating system, a variable speed generator, comprising an armature and a work circuit, a cut-out switch comprising a magnectically tractable armature and contacts connected in the work circuit for closing and opening the work circuit and operable by the magnetically tractable armature at predetermined high and low generator voltage values, a relay comprising a magnetically tractable armature and contacts connected in a circuit controlling the field energization and operable by the magnetically tractable armature responsive to predetermined high and low voltage values to maintain the generator voltage substantially constant, a magnetic circuit for each armature comprising a core element, a common winding for both core elements, a circuit for energizing the winding commensurably with voltage generated in the armature, separate resilient retracting means for the relay and switch, separate adjusting means for the resilient retracting means to adjustably vary the operating voltages of the switch and relay and a common adjusting means for simultaneously varying both the resilient retracting means to adjust the said voltages, the separate adjusting means permitting adjustment of the switch and relay to operate at the same voltage and the common adjusting means permitting this voltage to be varied.

10. In an electric generator construction, a generator frame comprising a walled compartment, an aperture in the compartment wall, a generator armature positioned within said walled compartment and adapted to be connected to a load circuit, a switch base disposed in the aperture and secured upon the compartment wall, said base having at least a portion thereof shaped to substantially close the aperture, an electro-magnetic switch supported on the base comprising a magnetic circuit including a ferrous core element and a magnetically tractible armature and switch contacts controlled by movement of the armature, a winding for the core element, a circuit for energizing the winding commensurably with voltage generated in the armature, and a removable band disposed around the generator frame and the switch and when removed giving access to the switch.

11. In an accessory apparatus adapted to be applied to a generator of the type having an aperature in the generator frame wall, a base in the form of a pan disposable in the aperture and having a peripheral flange adapted to overlap outer edge portions of the aperture, switch contacts and a magnetically tractable switch operating armature on the base, a magnetic circuit for the armature on the base comprising a core element, and a winding on the core element.

12. In an accessory apparatus adapted to be applied to a generator of the type having an aperture in the generator frame wall, a base in the form of a pan disposed in the aperture and having a peripheral flange adapted to overlap outer edge portions of the aperture, switch contacts and a magnetically tractable switch operating armature on the base, a magnetic circuit for the armature on the base comprising a core element, a winding on the core element, and a band disposed around the generator frame covering the pan.

13. An accessory apparatus as described in claim 11 and in which the switch contacts and magnetically tractable switch operating armature on the base are in the pan and the core element and winding on the base are under the pan.

14. In an accessory apparatus adapted to be applied to an electric generator having a load circuit, a base, a voltage regulating vibratory electro-magnetic switch for controlling the generator voltage and an electro-magnetic cutout switch for controlling the load circuit mounted on the base, and a common energizing winding for both switches adapted to be energized by voltage of the generator and having a portion formed to embrace a pole of the generator.

15. In an electric generator construction, a generator frame comprising a walled compartment having an aperture in the compartment wall, a generator armature disposed within said walled compartment, a field pole having a winding whereby it may be energized with magnetic flux of a normal polarity by current generated in the armature, a winding of opposite polarity on the pole and a circuit whereby it may be energized commensurably with voltage generated in the armature, a switch base disposed in the aperture and secured upon the compartment wall, an electro-magnetic switch supported on the base and comprising a magnetic circuit including a ferrous core element, a vibratory armature and switch contacts controlled by movement of the armature, and the winding of opposite polarity having a portion thereof looped around the ferrous core element, said base being of pan form and seated in the aperture and having a peripheral flange overlapping the outer edge of the aperture, and the switch armature and contacts being disposed in the pan and the ferrous core element and winding portion being disposed under the pan.

16. In an electric generator construction, a generator frame comprising a walled compartment having an aperture in the compartment wall, a generator armature disposed within said walled compartment, a field pole having a winding whereby it may be energized with magnetic flux of a normal polarity by current generated in the armature, a winding of opposite polarity on the pole and a circuit whereby it may be energized commensurably with voltage generated in the armature, a switch base disposed in the aperture and secured upon the compartment wall, an electro-magnetic switch supported on the base and comprising a magnetic circuit including a ferrous core element, a vibratory armature and switch contacts controlled by movement of the armature, and the winding of opposite polarity having a portion thereof looped around the ferrous core element, and said base being of pan form and seated in the aperture and having a peripheral flange overlapping the outer edge of the aperture, and the switch armature and contacts being disposed in the pan and the ferrous core element and winding portion being disposed under the pan, said magnetic circuit including ferrous portions extending from the ferrous core element through the pan bottom into proximity with the armature.

17. In an electric generator construction, a generator frame comprising a walled compartment having an aperture in the compartment wall, a generator armature disposed within said walled compartment, a field pole having a winding whereby it may be energized with magnetic flux of a normal polarity by current generated in the armature, a winding of opposite polarity on the pole and a circuit whereby it may be energized commensurably with voltage generated in the armature, a switch base disposed in the aperture and secured upon the compartment wall, an electro-magnetic switch supported on the base and comprising a magnetic circuit including a ferrous core element, a vibratory armature and switch contacts controlled by movement of the armature, and the winding of opposite polarity having a portion thereof looped around the ferrous core element, said base having the switch armature and contacts disposed on the outer side thereof and the ferrous core element and winding portion on the inner side thereof, and the base also having a flange overlapping the outer edge of the aperture, and a band-like element clamped upon and around the generator frame and clamping the base upon the frame at the aperture.

18. In an electric generator construction, a generator frame comprising a walled compartment having an aperture in the compartment wall, a generator armature disposed within said walled compartment, a field pole having a winding whereby it may be energized with magnetic flux of a normal polarity by current generated in the armature, a winding of opposite polarity on the pole and a circuit whereby it may be energized commensurably with voltage generated in the armature, a switch base disposed in the aperture and secured upon the compartment wall, an electro-magnetic switch supported on the base and comprising a magnetic circuit including a ferrous core element, a vibratory armature and switch contacts controlled by movement of the armature, and the winding of opposite polarity having a portion thereof looped around the ferrous core element, said switch base being of pan form and seated in the aperture and having a peripheral flange overlapping the outer edge of the aperture, and the switch armature and contacts being disposed in the pan and the ferrous core element and winding portion being disposed under the pan, and a band-like element clamped upon and around the generator frame and clamping the flange upon the frame at the aperture thereby substantially sealing the aperture and covering the contents of the pan.

19. In an accessory apparatus adapted to be applied to a variable speed variable voltage generator of the type having an aperture in the generator frame wall to convert the generator into a substantially constant voltage generator, a base adapted to be disposed in the aperture, switch contacts and a magnetically tractible switch operating armature on the abse outwardly thereof, an energizing ferrous magnetic circuit for the armature on the base inwardly thereof and comprising a core element, a winding on the core element, and a loop of the winding formed and disposed to be looped around a field pole of the generator, said base being of pan form and provided with a peripheral flange adapted to overlap the outer edge of the aperture.

DALE S. COLE.
LEONARD S. SPETH.